United States Patent
Anderson et al.

(10) Patent No.: US 6,836,309 B2
(45) Date of Patent: Dec. 28, 2004

(54) HIGH CONTRAST REFLECTIVE LIGHT VALVE

(75) Inventors: James Anderson, Cuyahoga Falls, OH (US); Michael Stefanov, Stow, OH (US)

(73) Assignee: HANA Microdisplay Technologies, Inc., Twinsburg, OH (US)

( * ) Notice: Subject to any disclaimer, the term of this patent is extended or adjusted under 35 U.S.C. 154(b) by 245 days.

(21) Appl. No.: 09/727,092

(22) Filed: Nov. 30, 2000

(65) Prior Publication Data

US 2002/0063818 A1 May 30, 2002

(51) Int. Cl.$^7$ ............................................. G02F 1/1337
(52) U.S. Cl. ......................................................... 349/130
(58) Field of Search ............................. 349/130; 353/20

(56) References Cited

U.S. PATENT DOCUMENTS

| | | | |
|---|---|---|---|
| 4,007,979 A | | 2/1977 | Coblitz .................... 350/256 |
| 5,486,840 A | * | 1/1996 | Borrego et al. .............. 345/7 |
| 5,548,422 A | * | 8/1996 | Conner et al. ............... 349/98 |
| 5,625,372 A | | 4/1997 | Hildebrand et al. ........... 345/8 |
| 5,742,373 A | | 4/1998 | Alvelda .................... 349/204 |
| 5,784,139 A | * | 7/1998 | Chigrinov et al. .......... 349/117 |
| 5,940,159 A | | 8/1999 | Alvelda .................... 349/202 |
| 5,982,553 A | | 11/1999 | Bloom et al. .............. 359/627 |
| 5,986,733 A | | 11/1999 | Winker et al. ............. 349/120 |
| 6,005,649 A | | 12/1999 | Krusius et al. .............. 349/73 |
| 6,055,053 A | | 4/2000 | Lesniak ..................... 356/366 |
| 6,188,456 B1 | * | 2/2001 | Koma ....................... 349/113 |
| 6,445,433 B1 | * | 9/2002 | Levola ...................... 349/113 |

OTHER PUBLICATIONS

H. Kurogane, et al. "Reflective AMLCD for Projection Displays: D–ILA"; SID 98 Digest; pp. 33–36.
R & D Lab, et al.; "Improvement of Transmitted Light Efficiency in SH–LCDs Using Quarter–Wave Retardation Films"; SID 00 Digest; pp. 902–905.

* cited by examiner

Primary Examiner—Tarifur R. Chowdhury
Assistant Examiner—P. R. Akkapeddi
(74) Attorney, Agent, or Firm—Roetzel & Andress

(57) ABSTRACT

The invention involves a novel method and structure for utilizing homeotropic vertically aligned nematic liquid crystal cells in the production of high contrast microdisplays. Two circular polarizers are used in order to propagate circularly polarized, rather than planar polarized, light through a liquid crystal cell. The use of circularly polarized light eliminates the liquid crystal director alignment requirements for the transmittance of light necessary for planar polarized light. With no director alignment requirement, it is possible to use perfectly homeotropic vertically aligned nematic cells irrespective of domain size and shape because fringing field induced director tilt will not decrease the transmittance of the liquid crystal cell.

17 Claims, 2 Drawing Sheets

HIGH CONTRAST REFLECTIVE LIGHT VALVE

FIELD OF THE INVENTION

The present invention pertains generally to liquid-crystal-on-silicon (LCoS) microdisplay systems and, more particularly, to a high contrast microdisplay system using a vertically aligned nematic reflective cell design.

BACKGROUND OF THE INVENTION

Microdisplays are the most recent addition to the family of flat-panel displays. Microdisplays are based on a number of different techniques to generate modular light using microfabrication technologies to produce a rectangular array of pixels on a semiconductor back plane. Examples of microdisplays include liquid crystal displays, field emission displays, and digital micro-mirror displays.

Liquid crystal displays (LCD) using a single polarizer plate (herein referred to as single polarizer plate method) provide high resolution and high contrast. Many LCD's utilize a quarter-wave plate to produce high contrast.

Japanese Laid-Open Patent Application No. 55-48733/1980 (Tokukaisho 55-48733/1980) discloses a reflective TN-method (45° twisted) LCD having one polarizer plate and a quarter-wave plate. By using a 45° twisted LC layer and controlling the electric field applied across the LC layer, the device displays black and white by effecting two states in which the polarization plane of the incident linearly polarized light on the quarter-wave plate is parallel and twisted by 45° with respect to the optic axis of the quarter-wave plate. The LCD display includes a polarizer, a 45° twisted LC layer, a quarter-wave plate, and a reflective plate arranged in sequence from the light incident side.

U.S. Pat. No. 4,701,028 (Clerc et al.) discloses a reflective-type LCD device including a combination of a single polarizer plate, a quarter-wave plate, and a vertically aligned LC cell. Japanese Laid-Open Patent Application No. 6-337421/1994 (Tokukaihei 6-337421/1994) discloses a reflective-type LCD device including a combination of a single polarizer plate, a quarter-wave plate, and a bend vertically aligned LC cell. A New Reflective Display with High Multiplexibility and Gray Scale Capability (Euro Display '96, page 464) also discloses a reflective-type LCD device including a combination of a single polarizer plate, a quarter-wave plate, and a vertically aligned LC cell. SID 96 Digest (page 763) discloses an example of an application to a reflective projection of a display mode in which chiral-dopant-containing LC having negative dielectric anisotropy is sandwiched between upper and lower substrates with vertical alignment.

A polarizer plate, in combination with the LCD device cell on the incident side, allows only the incident light and outgoing light polarized linearly in a certain direction to pass therethrough, and blocks light that is polarized linearly in all the other directions. If no electric field is applied to the LC layer, the incident light having passed through the polarizer plate is converted into circularly polarized light by an optical retardation compensation plate such as a λ/4 plate (quarter-wave plate), enters the LC layer, passes through the vertically or substantially vertically aligned LC layer, and without any further conversion or change, reaches a reflective plate. The light having reached the reflective plate is converted into circularly polarized light of reverse rotation by the reflective plate, passes through the LC layer, the λ/4 plate and other components in reverse order from the incident light, and is converted to light that is linearly polarized vertical to the linearly polarized incident light. The dark state is thus effected.

In addition, if the LC inclines or tilts upon application of an electric field across the LC layer to realize a phase difference under certain conditions, the incident circularly polarized light (having passed through the polarizer plate and λ/4 plate) is converted into linearly polarized light, becomes linearly polarized at the reflective plate, resulting in out-going linearly polarized light having the same polarization direction as the linearly polarized light at the polarizer plate, which is the incident light for the display device having passed through the polarizer plate. The bright state is thus effected.

There are some problems with the vertical alignment LCD device described in U.S. Pat. No. 4,701,028, U.S. Pat. No. 4,492,432, Japanese Laid-Open Patent Application No. 6-337421/1994, and A New Reflective Display with High Multiplexibility and Gray Scale Capability (Euro Display '96). Since the directions of the vertical alignment, especially those of the tilted vertical alignment, are parallel between the upper and lower substrates, the LC inclines or tilts in one direction and the viewing angle dependence of the image on the display surface is extremely large. Also, since the reflectance has a large wavelength dependence, undesirable coloring occurs.

Many LCD devices adopt a planar alignment mode where LC molecules are aligned parallel to the substrate when no voltage is applied. In a vertical alignment mode, LC molecules are aligned vertically relative to the substrate when no voltage is applied. When a LCD device operates in a so-called normally black mode, in which dark display is effected using the vertical alignment when no voltage is applied, a darker and more achromatic black display can be effected in comparison to the planar alignment mode, and therefore the display contrast is improved. Since the LC layer does not cause birefringence with light transmitted in the normal direction of the LC layer through the LC layer when no voltage is applied across the LC layer, the normally black mode has the characteristic that the required accuracy in the LC layer thickness (LC cell gap) is less.

In the vertical alignment mode, the LC layer thickness can be larger than the conventional planar alignment mode, there can be wider variations in the cell gap, and improved black display is possible. The primary factor limiting high contrast in LCD's is the amount of light which leaks through the display in the dark state. If vertical alignment normally black mode is used, there is little negative effect from light leaking as a result of the use of spacers to maintain the cell gap of the LC layer. For these reasons, vertical alignment is a preferred alignment for high contrast displays.

However, a uniform alignment state is difficult to achieve with the vertical alignment mode. It is also difficult to effect stable alignment when an electric field is applied across the LC layer and the alignment of the LC layer molecules is deformed from the vertical direction.

Publications including Enclosure Electrode Method (Japanese Laid-Open Patent Application No. 7-64089/1995 [Tokukaihei 7-64089/1995]) and Multidomain Method (Nikkei Microdevice, January 1998 Issue, page 136) disclose a proposal to change the shape of the substrate by changing the direction of the electric field, or by use of an insulating structure within the pixel area of a display.

Methods to slightly incline (tilt or pre-tilt) the initial LC alignment with respect to the normal direction of the substrate by rubbing (Japanese Laid-Open Patent Application No. 62-299814/1987 [Tokukaisho 62-299814/1987]) or by photo-induced polymeric alignment (Control of Liquid Crystal Alignment Using an Optically Active Polymer Film, by Mr. Yasushi IIMURA, Tokyo University of Agriculture and Technology, First JLCS-ALCOM Joint Conference) are disclosed to obtain uniform alignment with respect to the vertical alignment over the entire panel when voltage is applied. These methods provide alternative solutions to the problem other than the creation of microdomains. Unfortunately, this pretilt angle has been shown to reduce the effectiveness of the black state. (H. Kurogane, K. Doi, T. Nishihata, A. Honma, M. Furuya, S. Nakagaki, I. Takanashi, Victor Company of Japan, SID Dig. Tech. Pap., 29, 33–36).

The enclosure electrode method and the multidomain method sandwich the upper and lower substrates LC layer in a precise and complex structure. This results in an increased number of manufacturing processes, and the need to make a domain having a period of repetition equal to the size of a pixel. The period of repetition of an insulating component or the structure of an enclosure electrode, which defines the period of repetition of the domain cannot be designed freely due to the need to effect stable alignment, and must be designed to fall in a certain range.

To achieve a stable vertical alignment, through the electrode structure or substrate structure, the rubbing and photo-induced alignment methods that are free from such problems are preferable. However, it would be most preferable to eliminate these pre-tilt alignment manufacturing steps altogether.

In an attempt to eliminate pre-tilt alignment techniques while taking advantage of the properties of vertically-aligned LCD's, electric-field-aligned multi-domain perfectly homeotropic (PH) (also called super homeotropic (SH)) mode vertically aligned nematic (VAN) LCD's have been developed. These cells have liquid crystal molecules that are oriented in a perfectly homeotropic direction (perpendicular to the cell surface) which is uniform from one cell surface to another. They allow for wide-angle viewing, high contrast, and fast response characteristics. In these modes, LC alignment is divided into four regions for each pixel. Cells in these modes require that the LC director be aligned at a 45° angle from the transmission axes of linear polarizers. Any deviation from the ideal 45° angle reduces brightness and creates a dead space or a dark region at the boundaries of the four domains. These dark regions cause a reduction of effective aperture ratio, thereby resulting in low light transmittance of the panels.

SID 00 Digest (page 902–905) disclosed a method for improving light efficiency for transmissive LCD's. The method is aimed toward solving the problem noted above. Two λ/4 retardation films oriented at 45° with respect to the x-axis of linear polarizers were used in order to achieve circularly polarized light propagation through the LC cell. Because the light is circularly polarized, rather than plane polarized, the transmitted light intensity is irrespective of the in-plane orientation of the LC director. Therefore, because the intensity of transmitted light depends only on the optical retardation, the dark regions resulting from derivation of the angle of the LC director are eliminated.

One particular type of reflective liquid crystal (LC) technology, the liquid-crystal-on-silicon (LCoS) microdisplay is emerging as an attractive choice for a wide variety of applications. These applications include: multimedia front projectors, rear-projection computer monitors, rear-projection televisions, and near-to-the-eye (NTE) displays. The advantage of LCoS over other reflective type LC devices is that LCoS provides high performance, high-information-content microdisplays at significantly lower cost than competing technologies. The is due in part to the fact that the active matrix of driving circuitry for the pixels of the display is produced by conventional silicon transistor fabrication.

In addition, reflective-type direct view LCD's offer a number of design advantages over transmissive-type LCD's. A reflective LCD, since adopting a different display method from the transmissive LCD with no backlight, can save the power consumption for the light source. In reflective LCD's, the space and weight for the backlight can be spared. In other words, the reflective LCD consumes less power and can obtain enough power from a smaller battery, being suitable for devices whose priority is light weight and thin size. If the reflective LCD is designed having the same size or weight as a transparent LCD, the reflective LCD can accommodate a larger battery, and therefore operate much longer than a transparent LCD.

Another feature of the reflective LCD can be found in the contrast characteristics of the display surface. The light emitting display, for example a Cathode Ray Tube (CRT), has a greatly decreased contrast ratio in the daylight. A transparent LCD, having undergone low reflection processing, also suffers from a largely decreased contrast ratio when the surrounding light, for example, direct sun light, is strong in comparison to the display light. A reflective LCD provides display light proportional to the amount of surrounding light, being especially suitable for displays used outdoors, such as portable information terminals, digital cameras, and portable video cameras.

SUMMARY OF INVENTION

In accordance one aspect of the present invention, a light valve for a microdisplay is provided which utilizes circularly polarized light and a homeotropic vertically aligned nematic mode reflective liquid crystal cell. In one embodiment, an on-axis design is disclosed in which a circular polarizer is used to circularly polarize non-polarized light from a light source. The circularly polarized light is then reflected by a non-polarizing beam splitter toward a reflective liquid crystal cell. After the light is reflected by the liquid crystal cell, a second circular polarizer is used to either block the light if the microdisplay is in such a state that it does not affect the light, or transmit the light if the microdisplay is in such a state that it retards the light by a quarter wave upon a single pass. In another aspect of the present invention, an off-axis light valve for a microdisplay is provided which does not utilize a beam splitter and in which light is incident on both circular polarizers and on the liquid crystal cell off-axis.

Also according to the present invention, there is provided a LCD device and method of producing a high contrast microdisplay with vertically aligned nematic mode reflective liquid crystal cell having no pre-tilt inducing mechanism. The use of circularly polarized light eliminates the need for exact domain size and shape requirements, and the need for specific director orientation. Therefore, fringe fields alone are sufficient to induce a director tilt, thereby eliminating the need for pre-tilt inducing or rubbing processes.

In another aspect of the present invention, a light valve utilizing a single circular polarizer to achieve ultra high contrast is provided for use in a high contrast direct view reflective liquid crystal display device.

Advantages of the present invention are: a reflective display with perfectly homeotropic alignment in vertically aligned nematic mode that achieves ultra high contrast; a method of producing a high contrast reflective display that can be manufactured without utilizing rubbing, ultraviolet, or other pretilt-inducing process; an MVA microdisplay without domain size and shape requirements; elimination of the negative effects of fringing fields on image quality of reflective microdisplays; a reflective display that is capable of use with a wide range of different wavelengths of light.

Still other advantages of the invention will become apparent to those skilled in the art upon a reading and understanding of the following detailed description, accompanying drawings and claims.

DETAILED DESCRIPTION OF PREFERRED AND ALTERNATE EMBODIMENTS

The present invention utilizes the properties of circularly polarized light in combination with PH-VAN cells in a LCD to create a high contrast microdisplay. As used herein, circularly polarized light refers to a situation where the direction of polarization rotates in time about a line parallel to the direction of propagation of the light. Circularly polarized light can also be thought of as polarized light where the orientation of the plane of polarization has a time averaged probability function evenly distributed about the direction of propagation of the light. Often, light is circularly polarized through the use of a polarizer and a partial wave plate, or more specifically, a quarter waveplate ($\lambda/4$).

Figure 1:
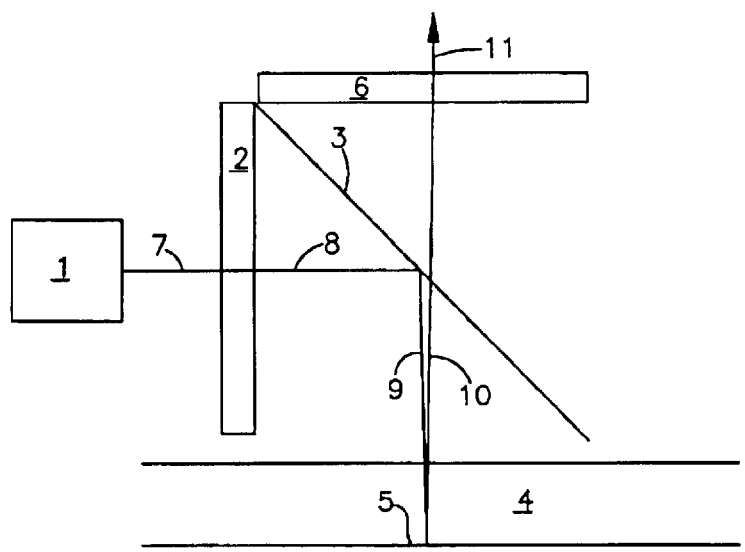
FIG. 1 is an off-axis embodiment of the present invention for use in microdisplays.

Referring to FIG. 1, a light source 1 emits non-polarized light 7, which is incident on circular polarizer 2. Circular polarizer 2 then converts the light to circularly polarized light 8 which is reflected by a non-polarizing beam splitter (NPBS) 3. After being reflected off the NPBS, the light 9 enters the LC cell 4 and is reflected off of the pixel surface or back plane of the bottom substrate 5 of LC cell 4. Thereafter, the outgoing light 10 is passed through a second circular polarizer 6.

The light 7 emitted from light source 1 may be any light, preferably non-polarized light, such as incandescent lighting, fluorescent lighting, electroluminescent lighting. The wavelength of light 7 may be anything in the visible spectrum, or anywhere from 400 nm to 700 nm. The NPBS, the characteristics of which are well known in the art, may be an inconel beam splitter, a polka dot beam splitter, a non-polarizing beam splitter cube, a pellicle beam splitter, a grating beam splitter, a mirror-type beam splitter such as a half-silvered mirror, or any other type of NPBS. LC cell 4 may be any homeotropic vertically aligned nematic reflective cell. The present design utilizes an LCoS cell, although any other type of reflective cell may be used. Light source 1 and the NPBS 3 are configured such that the incoming light 8 is reflected off of the NPBS 3 such that the reflected light 9 is generally on-axis with the LC cell 4. In other words, the reflected light 9 is generally perpendicular to the surface of LC cell 4. Because the reflected light 9 approaching LC cell 4 is generally perpendicular to LC cell 4, the light 10 reflected by the pixel surface of the bottom substrate 5 of LC cell 4 is also generally perpendicular to LC cell 4. Thus, when a second circular polarizer 6 is positioned generally parallel to LC cell 4, the light 10 approaching the circular polarizer 6 is on-axis with or generally perpendicular to the circular polarizer 6.

The precise nature of the circular polarizer 2 is not critical, as any circular polarizer will work. It may be any film or combination of films that produce circularly polarized light. For example, the circular polarizer may be a linear polarizer and $\lambda/4$ film or $\lambda/4$ plate combination, or a cholesteric film, as is known in the art. If it is a linear polarizer set at a 45° angle with a quarter wave plate, it is preferable that a single-order plate be used so that dependence on angle and wavelength is minimized. Quarter-wave plates are made from plastics and crystals or they are constructed holographically. A plastic wave plate is, however, more dispersive, and has lower optical properties than a crystalline or holographic wave plate. The invention is not dependent upon a particular type of polarizer and quarter wave plate or polarization rotator, and includes all operative embodiments. For example, the light exiting the linear polarizer may be P or S polarized and the polarization rotator may be left or right handed.

If circular polarizer 2 is right handed, light 8 passed through circular polarizer 2 will be right handed circularly polarized. Upon reflecting off of NPBS 3, light 9 will have its handedness reversed. Therefore, light 9 will be left handed circularly polarized. Left handed circularly polarized light 9 will pass through the LC layer of LC cell 4 and reflect off of the pixel surface of the bottom substrate 5. If LC cell 4 is off (zero voltage state) the handedness of the light will reverse so that light 10 will be right handed circularly polarized. If the LC cell 4 is on (voltage applied) light 10 will be left handed circularly polarized just as is light 9. Light 10 is incident on circular polarizer 6, which is opposite handed from circular polarizer 2. If circular polarizer 2 is a right handed circular polarizer, circular polarizer 6 must therefore be a left handed circular polarizer. Therefore, if light 10 is right handed (LC cell 4 off) circularly polarized, it will not pass through left handed circular polarizer 6. But if light 10 is left handed (LC cell 4 on) circularly polarized, it will pass through circular polarizer 6. Because light will not pass through the circular polarizer when LC cell 4 is in a zero voltage or off state, the LCD can be described as zero voltage black or normally black.

Figure 2:
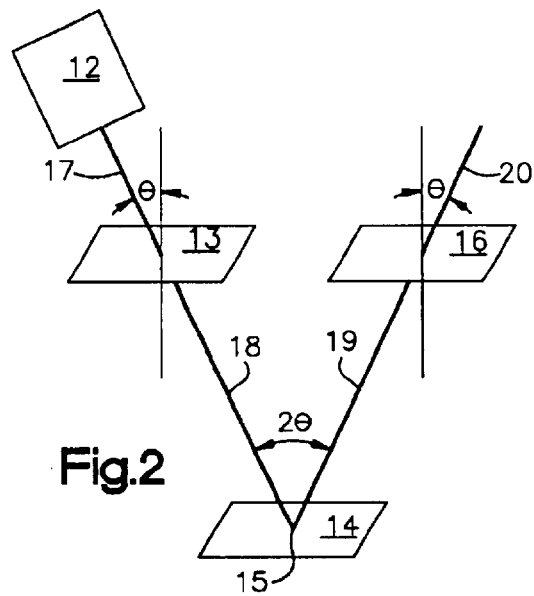
FIG. 2 is an on-axis embodiment of the present invention for use in microdisplays.

FIG. 2 depicts an off-axis design for the present invention. As in FIG. 1, a light source 12 emits non-polarized light 17, which is incident on circular polarizer 13. Circularly polarized light 18 enters the LC cell 14 and reflects off of the pixel surface of the bottom substrate 15. Thereafter, outgoing light 19 is passed through a second circular polarizer 16.

Unlike the embodiment shown in FIG. 1, light 18 is off-axis in relation to circular polarizer 13. The angle of incidence of the light 17 to circular polarizer 13 can be described as θ, where θ is the angle representing the number of degrees that the incident light is off-axis. LC cell 14 is generally positioned in parallel with circular polarizer 13 and circular polarizer 16. This is not a requirement however. Circular polarizer 13 and circular polarizer 16 may make some angle with the LC cell 14. After passing through circular polarizer 13, light 18 travels the same path as light 17. Thus, the angle of incidence of light 18 to LC cell 14 is also θ. Circularly polarized light 18 enters LC cell 14 at θ degrees off-axis, passes through the LC layer of LC cell 14, and is thereafter reflected by the pixel surface of the bottom substrate 15 of LC cell 14. The reflected light 19 is also θ degrees off-axis, but in the opposite direction. Therefore, the angle created by the paths of light 18 and light 19 can be described as 20. The angle θ is determined by the optical setup, in which a variety of factors must be considered, as known in the art. Because circular polarizers 13 and 16 do not function as well when the incident light is off-axis, various techniques are used to compensate for imperfect circular polarization so that the output of a circular polarizer having an off-axis light source will resemble the output of a circular polarizer having an on-axis light source. This requires specific angles of incidence in order to accurately compensate. Thus, there is no ideal angle θ. In one embodiment, a configuration where θ is approximately 15° and 2θ is 30° is operative, however other ranges of degrees can be used.

Alternatively, it may be desirable to position circular polarizers 13 and 16 so that they are not in parallel with LC cell 14, but are on-axis with light 17 and 19 respectively. After determining the desired angle to be formed by the paths of light 18 and light 19, 20, circular polarizer 13 may be positioned so that it is on-axis with light 17, which is θ degrees from parallel to LC cell 14. Likewise, circular polarizer 16 may be positioned so that it is on-axis with light 19, and θ degrees from parallel to LC cell 14, thereby eliminating the problems associated with off-axis incident light.

As in the embodiment shown in FIG. 1, light 17 emitted from light source 12 may be any non-polarized light of any wavelength across the visible spectrum. LC cell 14 may be any homeotropic vertically aligned nematic reflective cell. The present design utilizes an LCoS cell, although any other type of reflective cell may be used. Likewise, the type of circular polarizer is not critical to practice the invention. If circular polarizer 13 is right handed, the light 18 will be right handed circularly polarized light. Light 18 passes through the LC layer of LC cell 14 and is thereafter reflected by the pixel surface of the bottom substrate 15. The polarization of the light 19 after being reflected is dependent on the state of LC cell 14. If LC cell 14 is off, or in a zero voltage state, the handedness of the light will reverse and light 19 will be left handed circularly polarized light. If LC cell 14 is on, however, light 19 will be right handed circularly polarized light, as is light 18. Light 19 is incident on a second circular polarizer 16, which is of the same handedness as circular polarizer 13. Because circular polarizer 13 was chosen as a right handed circular polarizer in this example, circular polarizer 16 must also be right handed. Therefore, light 19 will pass through circular polarizer 16 when light 19 is right handed circularly polarized, but not when light 19 is left handed circularly polarized. Thus, if LC cell 14 is in a zero voltage state, no light will pass through circular polarizer 16, and if LC cell 14 is on, light 19 will pass through circular polarizer 16, thereby becoming non-circularly polarized light. As in the embodiment depicted in FIG. 1, an LCD in such a configuration is considered to be normally black.

Figure 3:
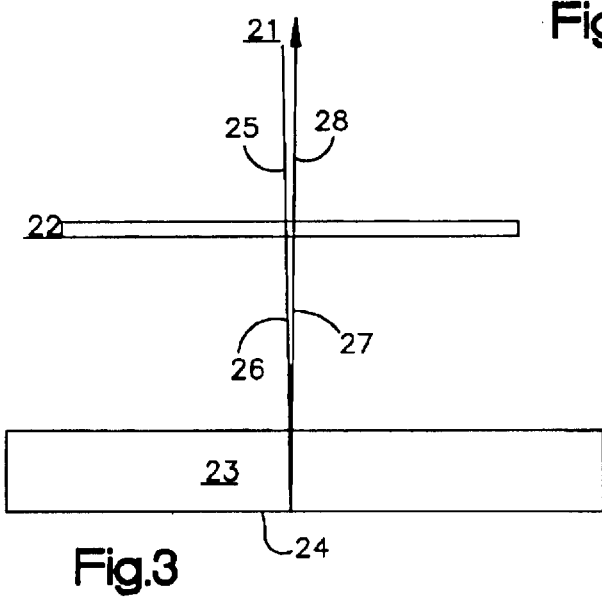
FIG. 3 is an embodiment of the present invention for use with a direct view LCD.

FIG. 3 depicts a light valve suitable for use with a direct view LCD. As in FIG. 2, a light source 21 emits non-polarized light 25, which is incident on circular polarizer 22. Circularly polarized light 26 enters the LC cell 23 and reflects off of the pixel surface of the bottom substrate 24. Thereafter, outgoing light 27 is passed back through circular polarizer 22.

As in the other embodiments depicted in FIGS. 1 and 2, light 25 emitted from light source 21 may be any non-polarized light of any wavelength across the visible spectrum. LC cell 23 may be any homeotropic vertically aligned nematic reflective cell. The present design utilizes an LCoS cell, although any other type of reflective cell may be used. Likewise, the type of circular polarizer is not critical to practice the invention. If circular polarizer 22 is right handed, the light 26 will be right handed circularly polarized light. Light 26 passes through the LC layer of LC cell 23 and is thereafter reflected by the pixel surface of the bottom substrate 24. The polarization of the light 27 after being reflected is dependent on the state of LC cell 23. If LC cell 23 is off, or in a zero voltage state, the handedness of the light will reverse and light 27 will be left handed circularly polarized light. If LC cell 23 is on, however, light 27 will be right handed circularly polarized light, as is light 26. Light 27 is also incident on circular polarizer 22. Therefore, light 27 will pass through circular polarizer 22 when light 27 is right handed circularly polarized, but not when light 27 is left handed circularly polarized. Thus, if LC cell 23 is in a zero voltage state, no light will pass through circular polarizer 27, and if LC cell 23 is on, light 27 will pass through circular polarizer 22, thereby becoming non-circularly polarized light. As in the other embodiments depicted in FIGS. 1 and 2, an LCD in such a configuration is considered to be normally black.

An important aspect of the present invention is that it utilizes normally black homeotropic vertically aligned nematic LC cells. A homeotropic VAN LC cell can be described as an LC cell in which the LC molecules are oriented in a direction perpendicular to the cell surface, and in which the orientation is uniform from one cell surface to another. Generally, homeotropic LC cells have LC molecules that are very close to perpendicular, e.g., within several degrees of perpendicular, or within 85°–90° from the cell surface. A PH-VAN cell is one in which the LC molecules are exactly 90° from the cell surface, or perfectly homeotropic. The closer to 90°, the higher the contrast that can be achieved. Therefore, the present invention preferably utilizes a PH-VAN cell.

A PH-VAN alignment mode, in the past, has been considered difficult to effect stable alignment when an electric field is applied across the LC layer and the alignment of the LC layer molecules is deformed from the vertical direction. Because reflective LCD's allow for extremely small pixel sizes, LC molecules are influenced by fringing electric fields between pixels. This presents a problem when planar polarized light is used because the transmitted light intensity is dependent on the orientation of the LC director. When the LC director deviates from an alignment of 45° to the transmission axes of linear polarizers, transmittance decreases, creating dark regions or dead space. Therefore, methods of inducing a director pre-tilt have been developed so that the orientation of LC molecules, and thus the director, would be more stabilized, thereby decreasing the effect of fringing fields on the director. However, by definition, a pre-tilt inducing method causes the LC molecules to be tilted slightly from an ideal 90° angle. Therefore, these methods yield displays with more limited contrast than a display utilizing a PH-VAN cell. It is preferable to eliminate the negative impact of fringing fields on the LC molecules, and thus, the LC director, while utilizing a PH-VAN LC cell.

The use of circularly polarized light, as opposed to planar polarized light, allows for the use of PH-VAN cells, while also eliminating the problems associated with fringing fields. When circularly polarized light is propagated through an LC cell, the intensity of transmitted light depends only on the optical retardation, which is a function of cell thickness. Therefore, the dark regions resulting from deviation of the angle of the LC director are eliminated because any deformation of director angle caused by fringing fields has no impact on the transmittance of light. This renders all measures taken in the past to reduce the effects of fringing fields, such as director pre-tilt and domain size and shape requirements, unnecessary for the present invention.

Figure 4A:
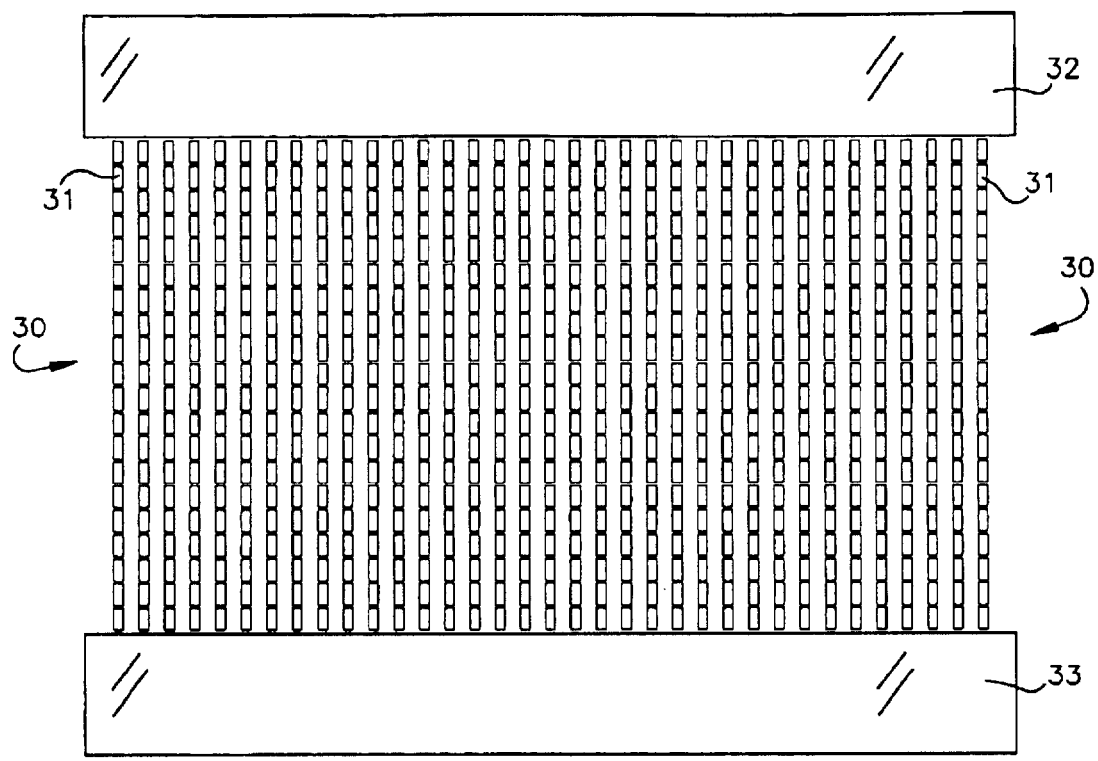
FIG. 4A shows the alignment of liquid crystal molecules at a zero voltage state in the present invention.

Referring to FIG. 4A, a PH-VAN LC cell 30 is in the zero voltage or off state. LC molecules 30 are oriented at 90° or perpendicular to both the transparent substrate 32 and the pixelated substrate 33. A PH-VAN LC cell 30 can be produced using any LC material having negative dielectric ansiotropy, as known in the art. A few non-limiting examples of such material are MLC 6609, MLC 6610, ZLI-4788-000, ZLI-4788-100, 95–465, and 95–785. In addition, a monomer may be mixed into the liquid crystal which is then polymerized in the zero field state in order to decrease the lowest energy state of the material. This then increases the torque on the liquid crystal when reorienting back to the zero field state, which in turn increases the switching speed of the device.

Figure 4B:
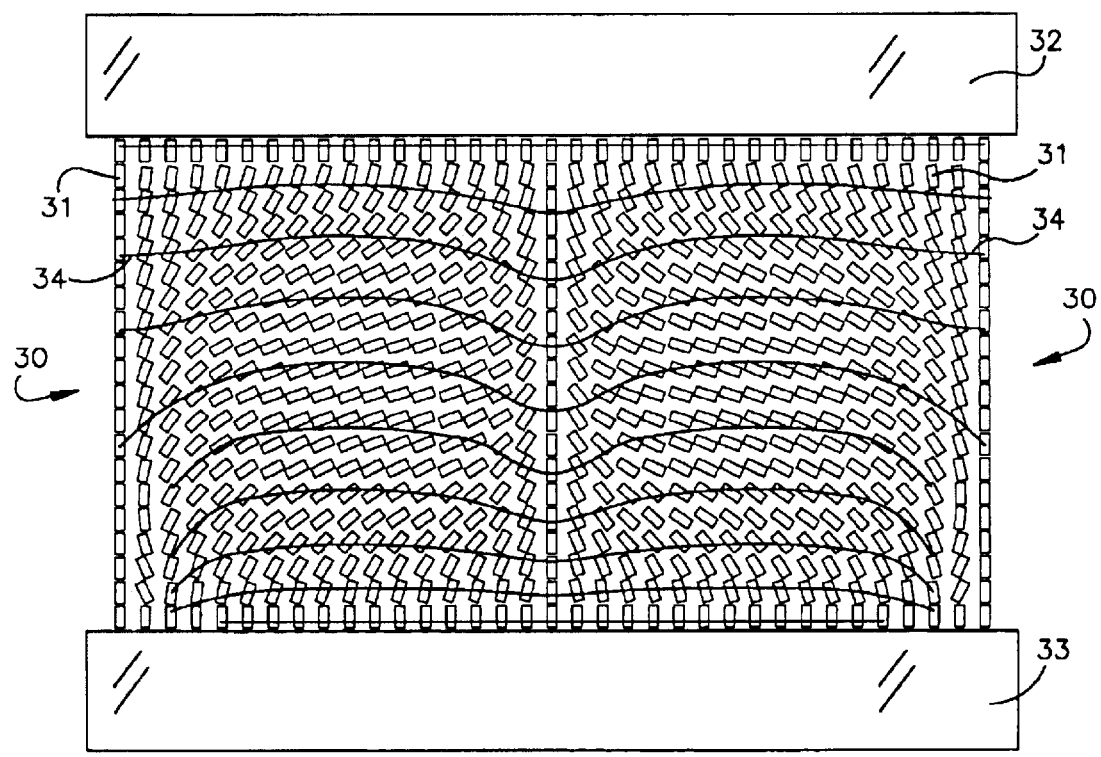
FIG. 4B shows the alignment of liquid crystal molecules as influenced by fringing fields.

FIG. 4B depicts a PH-VAN cell 30 under the effect of fringing fields 34. The fringing fields 34 actually induce a director tilt as LC molecules 31 are tilted away from 90° in accordance with the direction of the fringing field. As discussed earlier, the light transmittance is not dependent on director tilt direction when circularly polarized light is propagated through the LC cell, so the deformation from the optimal 45 degree direction does not create dead space or dark regions as it would if planar polarized light were being used.

The present invention has been described with reference to preferred embodiments. Obviously, it will be appreciated by those skilled in the art that various additions, modifications, deletions and alterations will occur to others upon a reading and understanding of this specification, and may be made to such preferred embodiments without departing from the spirit and scope of the invention. Accordingly, it is intended that all such modifications and alterations be included within the scope of the invention as defined in the following claims.

What is claimed is:

1. A light valve for use in high contrast reflective microdisplays, comprising:
    a light source that emits non-polarized light;
    a homeotropic vertically aligned nematic mode reflective liquid crystal cell with no pre-tilt inducing mechanism and no director orientation in a voltage applied state;
    a first circular polarizer of a first handedness positioned in the a path of light between the light source and the liquid crystal cell, whereby light incident upon the liquid crystal cell is circularly polarized in a first direction; and
    a second circular polarizer of the first handedness positioned in a path of the light reflected by said liquid crystal cell.

2. The light valve of claim 1 wherein said light is generally on-axis to said first circular polarizer, said liquid crystal cell, and said second circular polarizer.

3. The light valve of claim 1 wherein at least one circular polarizer is comprised of a linear polarizer and a quarter wave retarder.

4. The light valve of claim 1 wherein at least one circular polarizer is a cholesteric film.

5. The light valve of claim 1, wherein said liquid crystal cell is a liquid crystal on silicon type cell.

6. A light valve for use in high contrast reflective microdisplays, comprising:
    a light source that emits non-polarized light;
    a homeotropic vertically aligned nematic mode reflective liquid crystal cell with no pre-tilt inducing mechanism and no director orientation in a voltage applied state;
    a first circular polarizer of a first handedness positioned between the light source and the liquid crystal cell;
    a non-polarizer beam splitter positioned to reflect the light exiting the first circular polarizer toward the liquid crystal cell; and
    a second circular polarizer of a second handedness positioned in a path of light reflected the liquid crystal cell.

7. The light valve of claim 6 wherein at least one circular polarizer is comprised of a linear polarizer and a quarter wave retarder.

8. The light valve of claim 6 wherein at least one circular polarizer is a cholesteric film.

9. The light valve of claim 6, wherein said liquid crystal cell is a liquid crystal on silicon type cell.

10. The light valve of claim 6, wherein said first circular polarizer and said second circular polarizer are of opposite handedness.

11. A method of utilizing a homeotropic vertically aligned nematic mode reflective liquid crystal cell having no pre-tilt inducing mechanism or preferred field applied tilt direction to produce a high contrast microdisplay, comprising the steps of:
    passing non-polarized light from a light source through a first circular polarizer of a first handedness;
    reflecting circularly polarized light off a bottom substrate of a reflective liquid crystal cell; and
    passing light reflected off said bottom substrate through a second circular polarizer of a second handedness.

12. The method of claim 11 wherein at least one circular polarizer is comprised of a linear polarizer and a quarter wave retarder.

13. The method of claim 11 wherein at least one circular polarizer is a cholesteric film.

14. The method of claim 11, wherein said liquid crystal cell a liquid crystal on silicon typecell.

15. The method of claim 11, wherein said liquid crystal cell is a perfectly homeotropic vertically aligned nematic mode reflective liquid crystal cell.

16. A structure for controlling the transmission of light for use in high contrast reflective microdisplays, comprising:
    a light source that emits non-polarized light;
    a non-pretiled perfectly homeotropie vertically aligned nematic mode reflective liquid crystal cell;
    a first circular polarizer of a first handedness positioned between said light source and said liquid crystal cell; and
    a second circular polarizer of the first handedness positioned in a path of light reflected from said liquid crystal cell.

17. The light valve of claim 6, wherein the light is generally on-axis to said first circular polarizer, said liquid crystal cell, and said second circular polarizer.

* * * * *

UNITED STATES PATENT AND TRADEMARK OFFICE
CERTIFICATE OF CORRECTION

PATENT NO. : 6,836,309 B2  
DATED : December 28, 2004  
INVENTOR(S) : Anderson et al.

Page 1 of 1

It is certified that error appears in the above-identified patent and that said Letters Patent is hereby corrected as shown below:

Column 10,  
Line 53, please change "non-pretiled" to -- non-pretilted --.  
Line 53, please change "homeotropie" to -- homeotropic --.

Signed and Sealed this

Thirtieth Day of August, 2005

JON W. DUDAS  
*Director of the United States Patent and Trademark Office*